July 17, 1923.
E. O. STEBBER
RIM
Filed Aug. 2, 1922
1,462,426
2 Sheets-Sheet 2
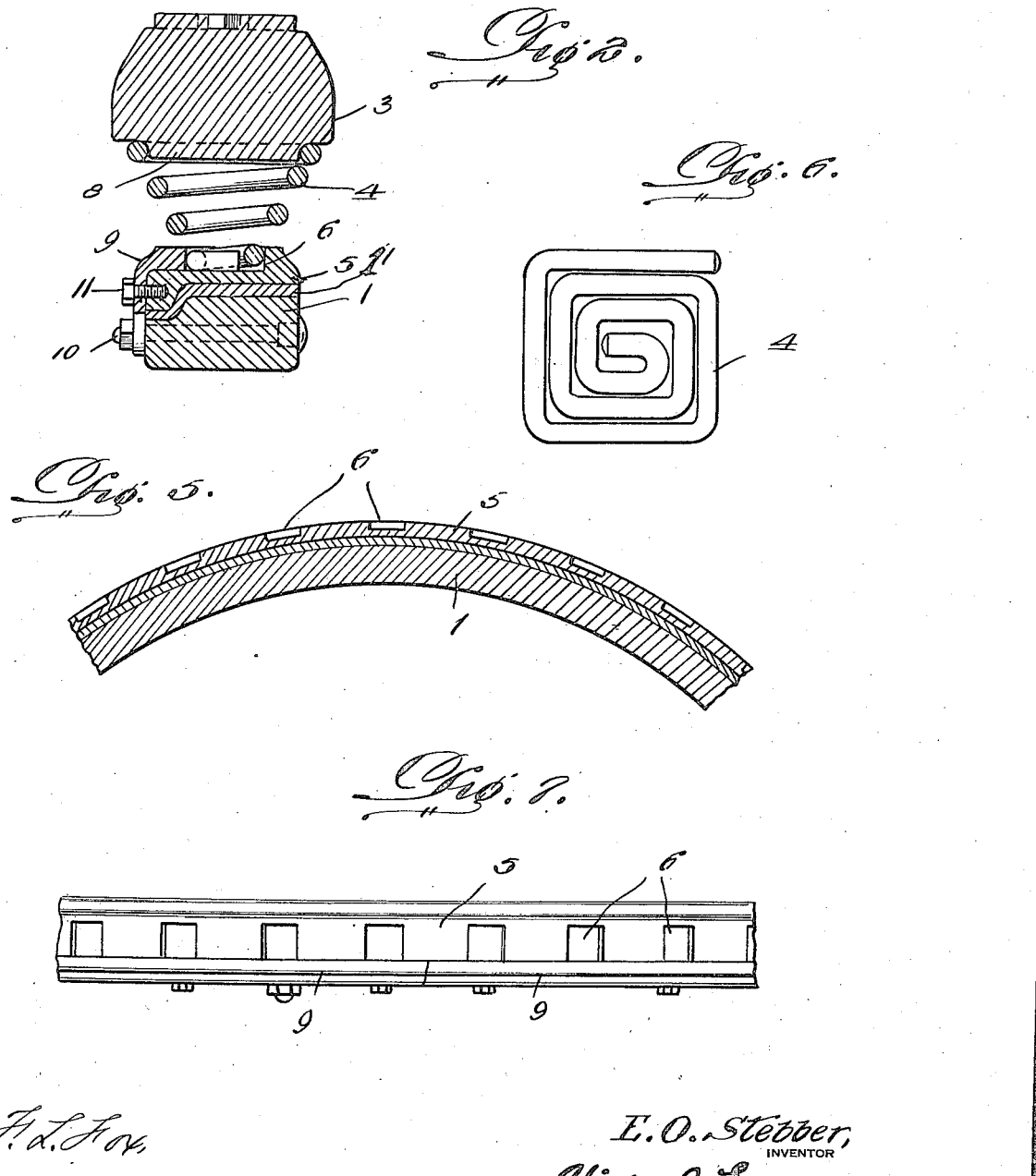

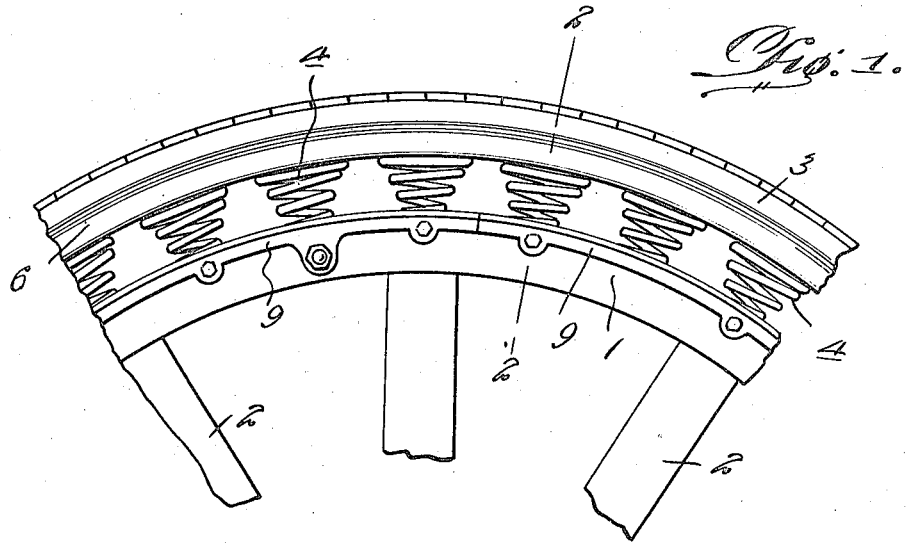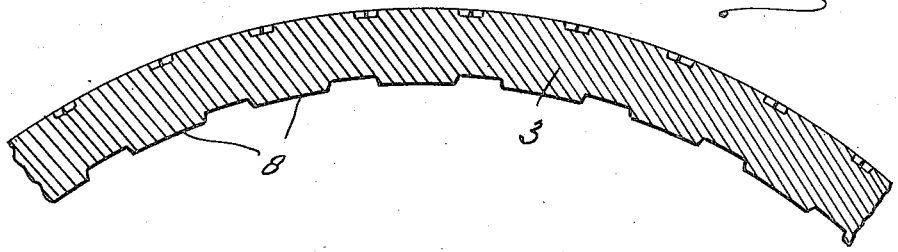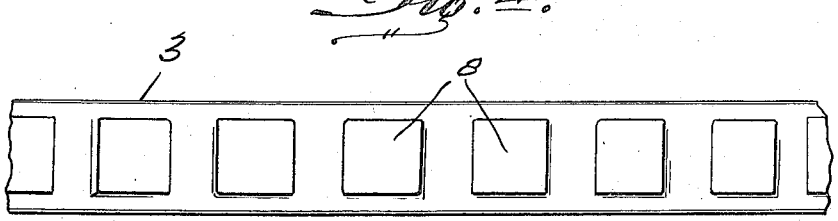

Patented July 17, 1923.

1,462,426

UNITED STATES PATENT OFFICE.

EMIL O. STEBBER, OF FLAGSTONE, BRITISH COLUMBIA, CANADA.

RIM.

Application filed August 2, 1922. Serial No. 579,207.

*To all whom it may concern:*

Be it known that I, EMIL O. STEBBER, a citizen of the United States, residing at Flagstone, in the Province of British Columbia and Dominion of Canada, have invented new and useful Improvements in Rims, of which the following is a specification.

This invention relates to improvements in wheels for vehicles the general object of the invention being to provide a wheel having a floating rim with springs interposed between said rim and the main rim, so that shocks will be absorbed by the springs, the same as if a pneumatic tire was used, thus doing away with the trouble which the use of a pneumatic tire involves.

Another object of the invention is to so arrange the parts that if a spring should break it may be easily replaced by a new one without jacking the car and without removing the other springs.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of portion of the improved wheel.

Figure 2 is a section on line 2—2 of Figure 1.

Figure 3 is a sectional detail view of a part of the outer rim.

Figure 4 is a detail view showing the construction of the inner face of this rim.

Figure 5 is a sectional detail view of the inner rim.

Figure 6 is a plan view of one of the springs.

Figure 7 is a detail plan view of the inner rim.

In these views 1 indicates the felly which is carried by the spokes 2 and which is provided with the band 1'. The outer rim is indicated at 3 and the drawings show this rim as being the tire of the wheel. This member 3 is spaced from the inner rim and is supported from the same by the springs 4. An inner ring 5 is removably seated upon the band 1' and this inner ring is provided with notches 6 to receive the small ends of the springs 4 and the tire or member 3 is formed with short square studs 8 to receive the large ends of the springs. The small ends of the springs are held in the notches by the sectional flanged ring 9 which is bolted to the band 1' by the bolts 10 and to the inner rim 5 by the small bolts 11. This member 9 closes the notches so as to hold the springs therein. The springs are of tapered shape and the coils are of rectangular shape, as shown in Figure 6, the small ends of the springs fitting in the notches, as before stated, and the large ends fitting over the studs on the tire. By removing the nuts from the bolts 10 the entire tire structure including the tire, the springs and the inner rim 5 can be removed from the wheel so that the device can be used as a demountable shoe. When it is desired to replace a spring or repair the same this can be done by removing the bolts 10 and 11 from the section 9 which is associated with the spring to be replaced so that it is not necessary to remove the entire structure from the wheel and it is not necessary to jack the wheel up. The springs will act to absorb shocks and insure easy riding of the vehicle and does away with the danger of punctures and blowouts incident to pneumatic tires.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having thus described my invention what I claim as new is:—

1. A wheel of the class described comprising an inner rim and an outer rim, springs placed between the rims, a sectional member bolted to the inner rim for holding the springs in position and means for fastening said sectional member to the wheel for holding the inner rim on said wheel.

2. A wheel of the class described comprising an inner rim having notches therein, an outer rim, springs placed between the rims and having their inner ends engaging the notches, a sectional flanged ring engaging the inner rim for holding the springs in the notches, bolts for holding said sectional ring to the inner rim and bolts for fastening said sectional ring to the wheel to hold the inner rim on the wheel.

In testimony whereof I affix my signature.

EMIL O. STEBBER.